United States Patent [19]
Stevens

[11] Patent Number: 5,474,721
[45] Date of Patent: Dec. 12, 1995

[54] METHOD OF FORMING AN EXPANDED COMPOSITE

[76] Inventor: Robert B. Stevens, 4122 N. 104th St., Milwaukee, Wis. 53222

[21] Appl. No.: 44,699

[22] Filed: Apr. 12, 1994

[51] Int. Cl.⁶ .................................................. B29C 67/22
[52] U.S. Cl. ................ 264/45.3; 264/46.4; 264/46.5; 264/46.6; 264/46.9; 264/54
[58] Field of Search .................................. 264/46.5, 46.6, 264/276, 161, 53, 51, 54, 46.4, 46.9, 45.3

[56] References Cited

U.S. PATENT DOCUMENTS

| | | | |
|---|---|---|---|
| 3,873,654 | 3/1975 | Smith | 264/321 |
| 3,879,245 | 4/1975 | Fetherston et al. | 264/321 |
| 3,940,468 | 2/1976 | Tunstall | 264/46.6 |
| 4,124,670 | 11/1978 | Cecka et al. | 264/257 |
| 5,230,844 | 7/1993 | Macaire et al. | 264/46.5 |

OTHER PUBLICATIONS

Disclosure Document of Robert B. Stevens (Apr. 18, 1991) No. 280 072.

*Primary Examiner*—Allan R. Kuhns

[57] ABSTRACT

Process using low to medium temperature thermoset epoxy composite materials and an expandable epoxy matrix material to efficiently form high strength composite parts of divers shapes in a single-one-step process. The composite material is placed within the periphery of a mold and expandable epoxy matrix material is placed between the layers of the composite material either before or after closing the mold and, then, subjecting the mold and its contents to heat which activates the epoxy resins in both the composite material and the matrix material causing the matrix material to expand thereby compressing the composite material in order to produce a competent composite part.

5 Claims, 1 Drawing Sheet

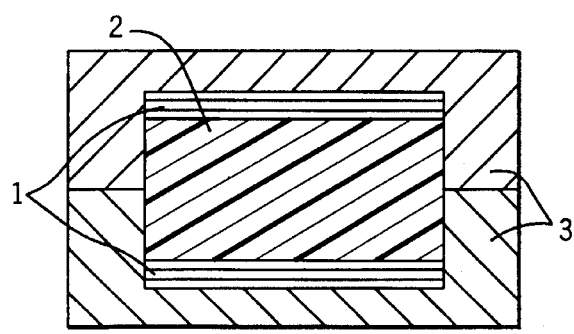
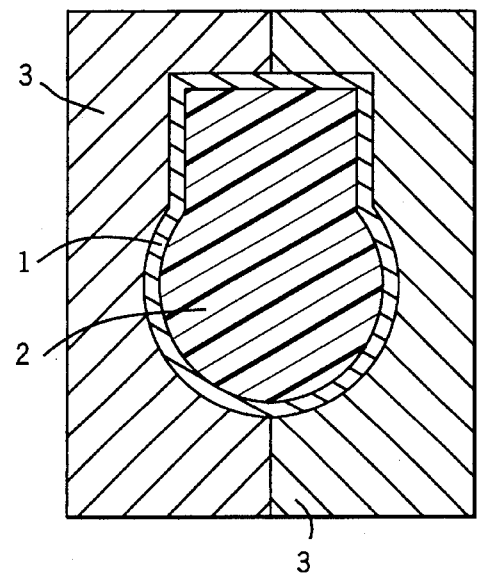
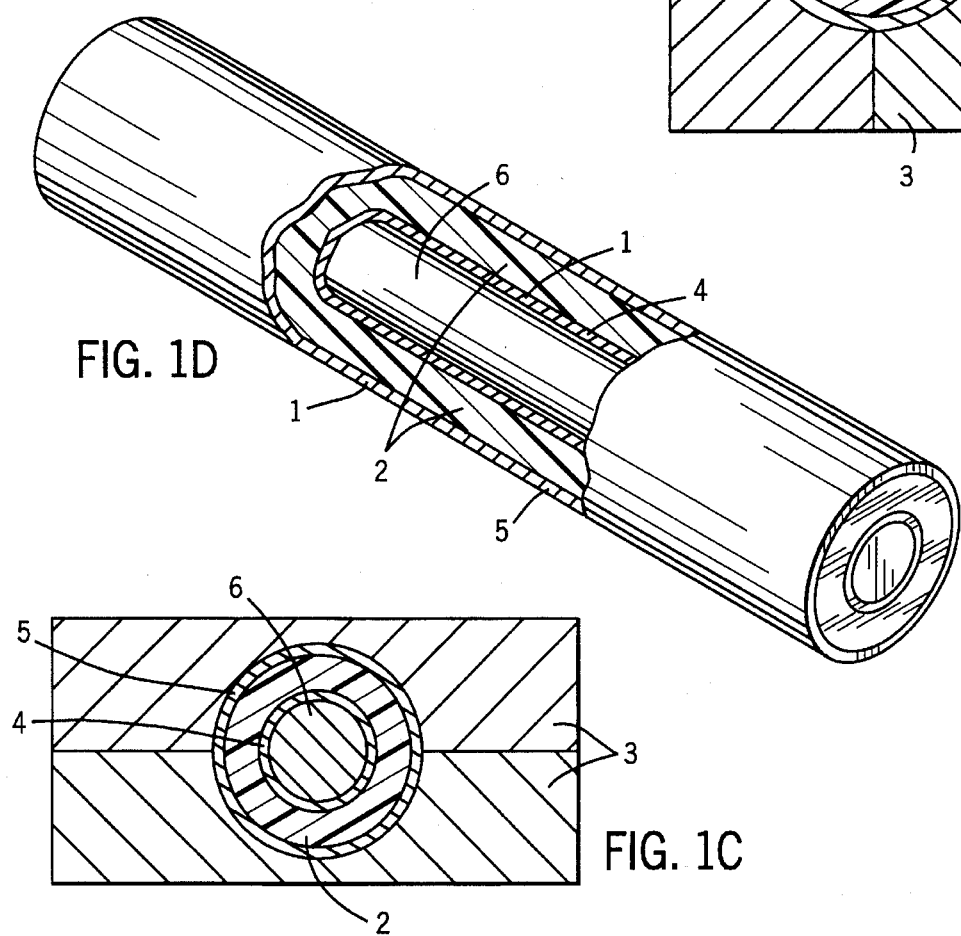

METHOD OF FORMING AN EXPANDED COMPOSITE

FIELD OF INVENTION

This invention relates generally to a method of fabricating low temperature thermoset composite materials by producing integrated "skins" of the desired configuration in one step.

BACKGROUND OF THE INVENTION

By conventional procedures, it is very tedious and time-consuming to fabricate thermoset composite parts and, therefore, expensive. By the utilization of this invention complicated composite parts can be fabricated with the use of expandable matrix materials by imparting the necessary compression pressure upon the composite material from within the mold as opposed to the conventional method of filing the mold cavity with all composite materials and leaving the mold slightly ajar upon the application of heat and, then, closing the mold to impart the needed pressure. Another method which has been conventionally used to impart needed pressure and heat is the use of an autoclave which is extremely inefficient from a standpoint of time and cost. This invention obviates the use of any of these inefficient conventional procedures to fabricate in low temperature thermoset composites.

Composites here referred to are the graphites (all forms), aramid materials (KEVLARS), glass fibers (all kinds), whether pre-preg or not. The mold material can be aluminum, steel, epoxy, glass fibers or other materials suitable for low-temperature molding.

SUMMARY OF THE INVENTION

The method for fabricating composite materials dictated by this invention is entirely different from any conventional autoclave process by which external pressure is imparted to the composite part by way of vacuum-bagging. This invention makes more efficient the processing of composite parts in that it eliminates and "pre-forming" of component materials that go into the final composite part. This invention dictates that all the raw materials to go into the final, cured part, are placed into the "clam-shall" mold and said mold is fully closed and, then, subjected to the required low-temperature cure cycle in accordance with the instructions provided by the composite material manufacturers. Upon completion of the cure cycle, the part emerges completed in this "one-step" process and the composite "skin" (the part) has been fabricated in an efficient and cost conscious procedure.

BRIEF DESCRIPTION OF THE DRAWINGS

FIG. 1a illustrates thermoset composite materials and expandable matrix material positioned within a mold cavity.

FIG. 1b illustrates thermoset composite materials and expandable matrix material positioned within a mold cavity having a relatively complex shape.

FIG. 1c shows an expandable matrix material between inner and outer layers of thermoset composite material in a mold having an inner core or mandrel.

FIG. 1d illustrates a tubular article produced using the mold of FIG. 1c.

DETAILED DESCRIPTION OF THE INVENTION

An integral part of this invention is the chemical matrix material which is controlled to expand at a given point after the imposition of heat and continues to expand between the layers of composite materials thereby providing the internal pressure needed to produce a competent composite part. The chemistry involved in the construction of the expandable matrix material can be made from one or more of the following classes of materials:

Epoxy Resins:
  Polyglycidyl Ethers
  Cresol or Phenol Formaldehyde Novolacs
  Diglycidyl Ethers of Bis-phenol A
  Cycloaliphatic Epoxides
  Glycidyl Esters
  Thioglycidyl resins
Epoxy Hardeners:
  Aliphatic Primary Amines
  Aromatic Primary Amines
  Tertiary and Secondary Amines
  Polyfunctional Amides
  Acid Anhydrides
  Acid curing agents—ie., Lewis Acids
Fillers:
  Carbon Fibers
  Glass Fibers
  Al or Mg Silicates
  Ca or Mg Carbonates
Expanding Agents:
  Water
  p,p'-oxybisbenezenesulfonylhydrazide
  dinitrosopentamethylenetetramine
  amine boranes and borohydrides
  trimethoxyboroxine The present invention is directed to correct for all of the problems inherent in the conventional fabrication of composite material.

The main object of the present invention does not have to consider any extraneous considerations such as coefficients of expansion, external pressures from autoclaves, vacuum bagging or any other mechanical pressure devices. By utilizing the pressure created by the expandable matrix material 2 trapped between the thermoset composite materials 1 inside the closed mold 3, sufficient internal pressure is created to properly compress the composite material and create a totally unified cured part comprising of the thermoset composite material and the matrix material.

By this simple process, thermoset composite structures of many complex shapes and sizes may be fabricated and said shapes and sizes are limited only by the definitions and configurations that can be imparted to a mold in which the composite structure is cured. These structures may include thin-walled "skins", and doubled-walled tubes as well as convoluted shapes as the design may require. In addition to structural flat parts, shapes of parts with large, irregular widths and oval and round parts which create double-wall composite structures, can be fabricated. An example of the different shapes and forms possible with this process can be viewed in FIG. 1. The double-walled composite structures are a particularly unique structure producible only by the use of this invention and to which many useful applications in industry are amenable. As can readily be seen in FIG. 1c, the double-walled composite structures are formed by molding expandable matrix material 2 between outer composite material 5 and inner composite material 4, which is supported by mandrel or core 6. Not only does the process dictated by this invention allow for fabrication in thermoset composites with great savings in time, labor and money, it allows for the design and fabrication of composite structures heretofore impossible to realize through conventional processes. All that is required in the process dictated by this invention is for the composite material to be placed in and against the periphery of the mold interior and then, either administering the expandable matrix material on both halves of the mold to the rim: and then closing the mold, or closing the mold with just the composite material laid-up against the periphery of the mold interior and, then, from outside the mold, through a nozzle penetrating the mold, inject the expandable matrix material into the mold between the layers of composite material until it is filled to capacity. The nozzle is then "shut-off" so that no expandable matrix material can escape and the mold is, then, exposed to moderate heat (low-temperature— 250—but some higher temperature thermoset composites can be used) and allowed to cure in accordance with the instructions of the composite material manufacturer (usually for one hour).

What is claimed:

1. A method for the production of a low temperature thermoset composite part comprising:

a) providing a mold having a cavity with a shape complementary to the shape of the composite part to be produced;

b) laying up pre-impregnated thermoset composite materials into the periphery of the mold cavity;

c) filling the mold cavity between layers of composite material, either prior to closing of the mold or after closing the mold, by injecting therein an expandable epoxy matrix material which, by action of an expanding agent, expands and fills the mold cavity and, upon heating, forms a totally unified cured part comprising the thermoset composite materials and the matrix material, wherein the expandable epoxy matrix material is selected from the group consisting of polyglycidyl ethers, cresol or phenol formaldehyde novolacs, diglycidyl ethers of bis-phenol A, cycloaliphatic epoxides, glycidyl esters and thioglycidyl resins and wherein said expanding agent comprises trimethoxyboroxine;

d) introducing heat into the mold cavity in an amount sufficient to activate both a resin in the composite material and the expandable epoxy matrix material, thereby permitting the expandable epoxy matrix material to expand and form a totally unified cure part with the thermoset composite materials, such that during a cure cycle sufficient compression is delivered to the composite material to form a desired shape; and e) cooling the mold, removing the part from the mold and removing any flash from the part.

2. The method of claim 1 where the part is a flat sheet.

3. The method of claim 1 wherein the part is a single-walled or double-walled tube.

4. The method of claim 1 wherein the thermoset composite materials comprise graphite, aramid materials or glass fibers.

5. The method of claim 1 wherein the expandable epoxy matrix material contains reinforcing fibers.

\* \* \* \* \*